United States Patent Office 3,198,815
Patented Aug. 3, 1965

3,198,815
FATTY AMIDO AMINO SULFONATE AND SULFATE SALTS OF AMPHOTERIC SULFONATES
Hans S. Mannheimer, Toms River, N.J., assignor to Hans S. Mannheimer and John J. McCabe, Jr., as joint venturers
No Drawing. Filed Aug. 7, 1964, Ser. No. 388,290
5 Claims. (Cl. 260—401)

This application is a continuation-in-part of my copending application Ser. No. 144,849, filed Oct. 13, 1961.

This invention relates to novel compositions and to methods for making them, and is directed to methods for making and to novel derivatives of certain amphoteric, water-soluble compounds characterized by having at least one

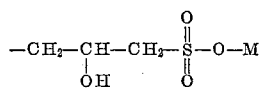

radical attached directly to a nitrogen thereof, with M being either hydrogen, sodium, potassium or other alkali metal or other cation equivalent therefor in the art of water soluble, amphoteric compounds. Said novel derivatives, hereinafter known as compounds of Formula IV, may be defined as detergent sulfonic acid or sulfate salts of said amphoterics.

The amphoterics from which compounds of the present invention may be derived are themselves useful as surface active agents, have good foaming characteristics and find use as general purpose detergents, textile treating, emulsifying and emulgating agents, and also as components in cosmetics and shampoos and are of the following formula:

(III)

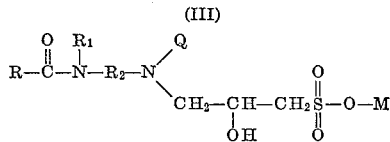

wherein R is a hydrocarbon radical of 6–24 carbon atoms; $R_1$ is selected from the group consisting of (a) hydrogen, (b) alkyl radicals of 1–6 carbon atoms, (c) hydroxy alkyl radicals of 2–6 carbon atoms and (d) alkylene oxide adducts of said hydroxy alkyl radicals containing 1–15 moles of alkylene oxides of 2–4 carbon atoms per hydroxy group therein; $R_2$ is selected from the group consisting of (e) alkylene groups of 2–6 carbon atoms, (f) hydroxy alkylene groups of 2–6 carbon atoms and (g) alkylene oxide adducts of (f) containing 1–15 moles of alkylene oxide of 2–4 carbon atoms per hydroxy group therein; Q is selected from the group consisting of (b), (c) and (d); and M is selected from the group consisting of hydrogen, and other cation equivalents, and preferably alkali metals and for most purposes sodium and potassium.

Said reactant compounds of Formula III, some specific examples of which are disclosed in my copending applications Ser. No. 120,949 filed June 30, 1961, and Ser. No. 132,261 filed August 8, 1961, may be produced by following the methods disclosed in the aforesaid applications. One of the reactants for producing reactant compounds of Formula III is my sultone described and claimed in my U.S. Patent 3,100,779 of Aug. 13, 1963, and being of the following formula:

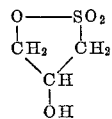

and the other reactants being compounds of the following formula:

(I)

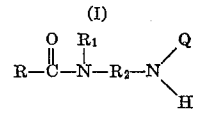

Said reactants of Formula I may be produced by employing methods well known to the art. Methods for producing said reactants of Formula I are disclosed in my U.S. Patents 2,781,378 of February 12, 1957, and 2,993,918 of July 25, 1961, and in general comprises reacting an appropriate diamine with an appropriate monocarboxylic acid as described in said patents. All of the monocarboxylic acids (R—COOH) generally described and specifically identified in said Patent 2,781,378 and in which R is a hydrocarbon radical of 6–24 carbon atoms and may be employed as reactants and examples of some of the diamines which may be employed as reactants therewith for the production of compounds of Formula I are amino ethyl ethanol amine $(NH_2C_2H_4NHC_2H_4OH)$ amino ethyl propanol amine $(NH_2C_2H_4NHC_3H_6OH)$ methyl amino isopropyl isopropanol amine $(CH_3NHC_3H_5NHC_3H_6OH)$ amino propanol propane diol amine $(NH_2C_3H_5OHNHC_3H_5(OH)_2)$ The resulting condensates produced with the formation of one mole of water are some compounds of Formula I. And others if desired may be derived from said condensates having an hydroxy group by alkyleneoxylation which may be effected by treating them with alkylene oxide to couple 1–15 moles thereof with the available hydroxy groups thereof. Of course, other specific methods known to the art may be used to provide certain of the compounds of Formula I, it being understood that the method for producing compounds of Formula I is not any part of the present invention.

The organic acid reacted with a diamine, examples of which are hereinbefore set forth, is one of 7–25 carbon atoms and containing a single COOH group, or any of the available anhydrides of said acids and by the term monocarboxylic organic acid as used herein, I mean to include both the acid and the available anhydride thereof which I regard as the equivalent of the acid. The esters, such as the methyl, ethyl or etc., esters such as $C_{11}H_{23}COOCH_3$ for example, are also equivalents of said acids. These acids may be: the aliphatic straight or branch chain saturated or unsaturated fatty acids as well as said fatty acids containing substituents, such as aryl radicals, as for example, acids of the type of Twitchell fatty acids; cycloaliphatic carboxylic acids preferably containing no more than 4 condensed nuclei and examples of which are hexahydrobenzoic, resinic and naphthenic acids; as well as aromatic and aromatic-aliphatic carboxylic acids, such as $(C_6H_5COOH)$, $(C_6H_5CH_2COOH)$, etc.

While carboxylic acids having any number of carbon atoms may be employed, I prefer to employ those having at least 7 carbon atoms and preferably 7–25 carbon atoms in straight chain relationship. The acids which I employ may be derived from a number of different sources. Among some of them are the acid components chosen from oil or fats of animal, marine or vegetable origin and these include; the acids of cocoanut, palm kernel, and palm oil, also of soy bean, linseed, olive, rapeseed, cottonseed, peanut and castor oil which contain large proportions of unsaturated fatty acids and also the acids derived from tallow, fish and seal oils, whale or shark oils and the hydrogenated acids from these sources. Moreover, the synthetic high molecular weight fatty acids, obtained by the oxidation of paraffin wax and similar high molecular weight hydrocarbons by means of gaseous oxidizing agents may be employed. In addition the acid may be one of the resinic acids, such as abietic acid, or the naphthenic acids and long chain fatty acids having an aromatic hydrocarbon radical connected directly with the aliphatic chain (Twitchell fatty acids) as are obtainable from oleic, ricinoleic, linoleic and similar unsaturated fatty acids. Instead of employing mixture of acids from oil, fats and resins, single acids may be used, for example caproic, pimelic, heptylic, caprylic, undecylic, lauric, palmetic, stearic, behenic, arachis, and carotic, oleic, erucic, linoleic, linolenic, ricinoleic and myristic acids.

My novel sultone employed as a reactant herein for preparing compounds of Formula III, which are to be employed as reactants in producing compounds of Formula IV, may be prepared by employing the procedure set forth in the following Example A, all parts being given by weight unless otherwise specified.

EXAMPLE A

About 104 parts of sodium meta bisulfite $Na_2S_2O_5$ were charged into a glass flask and then there was also charged into said flask 600 parts of water into which was dissolved 1 cc. of a 50% aqueous solution of NaOH thereby to dissolve said sodium meta bisulfite therein. The solution was then heated to about 90° C. and maintained at that temperature for a period of about 15 minutes thereby to convert substantially all of the sodium meta bisulfite to sodium acid sulfite ($NaHSO_3$). The reactant solution of sodium acid sulfite was cooled to about 28° C. and by slow additions 101 parts of epichlorhydrin was added thereto with constant stirring over a 45-minute period, and the temperature of the mass throughout said period was controlled by external cooling thereby to maintain the temperature thereof at about 47°–50° C. throughout said period. Thereafter and for the next 2½ hours, stirring of the mass was continued and its temperature maintained at 47°–50° C. Then with or without a reflux condenser coupled with said flask, the mass therein was heated to boiling and maintained in that condition for a period of about 1 hour. Then the mass in said flask is cooled to room temperature, is hereinafter known as Mass A, and consists essentially of an aqueous solution of the novel sultone, whose structural formula is hereinbefore set forth, and NaCl by-product.

Said novel sultone may be reacted with one or a combination of two or more of said compounds of Formula I by heating them together in the mole proportion of about 1–2 moles of and preferably 1.2–1.8 moles of sultone to 1 mole of said compounds of Formula I. The aforesaid reaction is carried out under acidic conditions due to the fact that my sultone imparts a pH below 7 to said aqueous medium carrying it and the other reactant. Said reaction is preferably carried out in an aqueous medium and with the use of external heat to provide an aqueous solution of one or a combination of two or more compounds which are internal salts of the following formula:

(II)

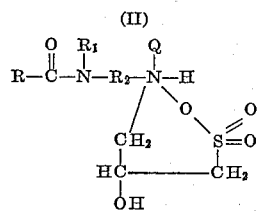

When a small quantity, as for example 1 cc., of said aqueous solution of a compound of Formula II is added to 100 cc. of clear tap water and shaken therewith, there is a change from clear to cloudy. This indicates its lack of water-solubility in low concentration in which said compounds normally would be used, as surface active agents. The structures thereof may be changed thereby to convert and render them water-soluble, in low concentrations, as well as high concentrations, amphoteric and further characterized by having good surface activity, detergent and wetting properties and useful in shampoos, cosmetics, in the fields of treating of textiles, etc.

For the aforesaid purposes the compounds of Formula II may under alkaline conditions in an aqueous medium be heated thereby to convert them into said water-soluble amphoterics having the other foregoing properties and being compounds of said Formula III which are soluble in low and high concentrations in an aqueous medium.

The alkaline agent preferably employed to render said aqueous medium alkaline is an alkali metal hydroxide, such as NaOH, KOH or the like and the amount of said agent is preferably at least about 1 mole proportion thereof per mole proportion of said sultone employed in producing the aqueous solution of compounds of Formula II.

The following are illustrative methods for producing illustrative compounds of Formula III, all parts being given by weight, unless otherwise specified.

*Example 1*

Said entire Mass A which is an aqueous solution of about 130 parts (1 mole) of my novel sultone, in Example A herein, is heated to 80° C. and while at that temperature there are added with stirring 330 parts (1 mole) of a compound, hereinafter referred to as compound X, of the following formula:

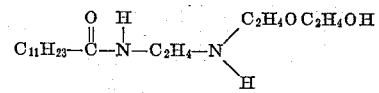

The resultant mass is then while being stirred, allowed to stand overnight in a room whose temperature is 20° C. The next morning, the mass which has cooled to 20° C., while stirred, is heated to and maintained at 80° C. for about 3 hours, where there is produced an aqueous solution having a pH of approximately 6.7 of a compound of the following formula:

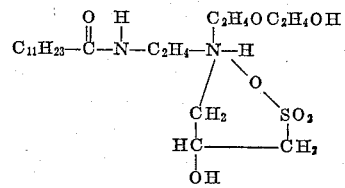

The aforesaid compound which is an internal salt is not water-soluble in low concentrations. This is evidenced when one cc. of said aqueous solution at the end of said 3-hour period is added to 100 cc. of clear tap water and shaken therewith it causes a change from clear to cloudy.

Then 88 parts of a 50% aqueous solution of NaOH is added slowly to said entire aqueous mass after said 3-hour period while constant stirring still is maintained and the entire mass is heated to and then maintained at a temperature of 75°–85° C. for a period of about 3 hours thereby to provide an aqueous solution hereinafter known as Solution 1 consisting essentially of water in which are dissolved the NaCl by-product and Reactant III–1 of the following formula:

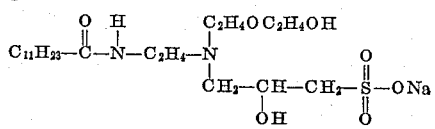

*Examples 2 and 3*

Employ the same procedure and components as set forth in Example 1, except that for the 330 parts (1 mole) of compound X employed therein, there are substituted 150 parts (.5 mole) of a capric acid derivative and 290 parts (.7 mole) of a stearic acid derivative respectively, which are the same as the compound X except that the radical ($C_{11}H_{23}$) thereof is replaced by the respective ($C_9H_{19}$) radical and the ($C_{17}H_{35}$) radical whereby there are produced Reactants III–2 and III–3 respectively, which are the same as Reactant III–1 except for the substitution of the $C_9H_{19}$ and $C_{17}H_{35}$ radicals respectively for the $C_{11}H_{23}$ radical of Reactant III–1.

*Examples 4 and 5*

Employ the same procedure and components as Example 1 except that instead of the 330 parts of compound X of Example 1 there are employed 260 parts (.66 mole) and 355 parts (.66 mole) respectively of the following respective reactants:

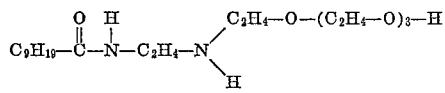

and

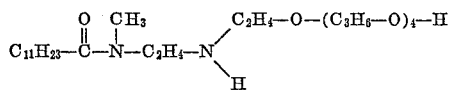

to produce Reactants III–4 and III–5 of the following respective formulas:

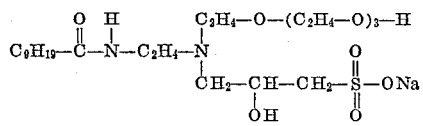

and

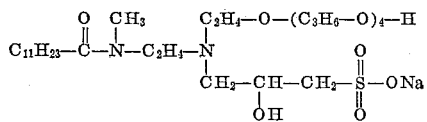

*Example 6*

Employ the same procedure and components as those set forth in Example 1 except that for the 330 parts of compound X there are substituted 230 parts (.8 mole) of Y compound of the following formula:

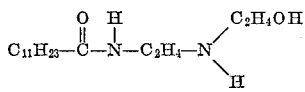

whereby there is produced aqueous solution of Reactant III–6 of the following formula:

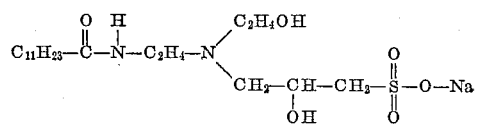

*Examples 7 and 8*

Employ the same procedure and components as set forth in Example 6, except that for the 230 parts of compound Y employed therein, there are substituted 195 parts (.75 mole) of a capric acid derivative and 370 parts (1 mole) of a stearic acid derivative of amino ethyl ethanol amine respectively, which are the same as the compound Y except that the radical ($C_{11}H_{23}$) thereof is replaced by the respective capryl ($C_9H_{19}$) radical and the stearyl ($C_{17}H_{35}$) radical whereby there are produced Reactants III–7 and III–8 respectively, which are the same as Reactant III–6 except for the substitution of the $C_9H_{19}$ and $C_{17}H_{35}$ radicals respectively for the $C_{11}H_{23}$ radical of Reactant III–6.

*Examples 9 and 10*

Employ the same procedure and components as Example 1 except that instead of the 330 parts of compound X of Example 1 there are employed 154 (.66 mole) and 198 (.66 mole) parts respectively of the following respective reactants:

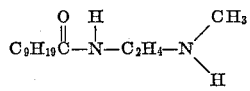

and

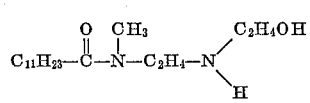

to produce Reactants III–9 and III–10 of the following respective formulas:

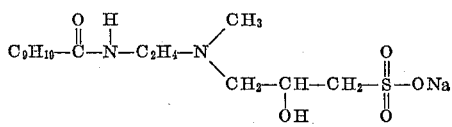

and

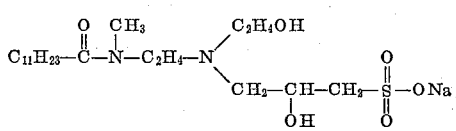

*Examples 11—on*

Employ the same procedure and components as those of Example 1 herein except that for the 1 mole proportion of compound X, there may be substituted about .6 to 1 mole proportion of any other compound which is the same as compound X, except that for the radical $C_{11}H_{23}$ thereof, there is substituted any other hydrocarbon radical of 6–24 carbon atoms and/or for the particular $R_2$, namely $C_2H_4$, there may be substituted any of the other $R_2$ groups herein defined, for the

group thereof there is substituted any of the other Q groups, and/or for the hydrogen of the amide nitrogen there is substituted any of the other $R_1$ groups all hereinbefore defined and specific examples of which are hereinbefore set forth so that there are produced literally hundreds of different amphoterics which are of the same formula as Reactant III–1 of said Example 1 herein except that for the radical $C_{11}H_{23}$ thereof there is substituted any other hydrocarbon radical of 6–24 carbon atoms, and/or for the hydrogen of the amide nitrogen there is substituted any of the other $R_1$ groups, and/or for the $C_2H_4$ there is substituted any of the other $R_2$ groups, and/or for the $C_2H_4$—O—$C_2H_4OH$ there is substituted any of the other Q groups.

All of said amphoterics of Examples 1–10 and 11—on are water-soluble, surface active amphoterics having excellent water-solubility at high as well as very low concentrations and in aqueous solution having good foaming properties and find the uses hereinbefore set forth, and may be employed as reactants for the production of novel compounds of this invention.

Prior to this invention water-soluble anionic detergent sulfonic and sulfonate salts have been known and used. In general they are relatively cheap when compared with the cost of compounds of Formula III. In addition said anionic detergent sulfonic acid and sulfate salts have such a high toxicity as determined by standard "$LD_{50}$ toxicity test by ingestion of a single dose" as to require the use of warning labels, and also have the further disadvantage that when employed as components of shampoos cause stinging of the eyes and sometimes irritation of the skin when such shampoos are used and water solutions thereof accidentally reach the eyes.

Examples of classes of said anionic detergent sulfonate and sulfate salts, known hereinafter as compounds of Formulas V are designated as G—M$_1$, with M$_1$ being an alkali metal and G being:

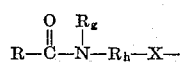

or

wherein R is as before defined, R$_f$ is an aliphatic, saturated or unsaturated hydrocarbon radical, and for most purposes alkyl or only ethylenically unsaturated hydrocarbon radical, of 6–20 carbon atoms or an aliphatic-aromatic hydrocarbon radical with a maximum of 20 carbon atoms and having at least 6 carbon atoms in the aliphatic portion thereof; R$_g$ is hydrogen, an alkyl radical of 1–8 carbon atoms, an hydroxy alkyl radical of 2–8 carbon atoms or 1–15 mole alkylene oxide adducts of the available hydroxy groups in said hydroxy alkyl radicals, or alkyl ether group of 2–8 carbon atoms having at least 1 oxygen linkage therein and otherwise being hydrocarbon; R$_h$ is alkylene, aromatic, or aromatic-aliphatic hydrocarbon group of 1–12 carbon atoms, or hydroxy alkylene group of 2–12 carbon atoms or 1–15 mole alkylene oxide adducts of available hydroxy groups in said hydroxyalkylene groups, aliphatic unsubstituted or hydroxy substituted ether groups of 2–8 carbon atoms and having at least one oxygen linkage therein; R$_k$ is an alkylene group of 1–12 carbon atoms, a hydroxy alkylene group of 2–12 carbon atoms, 1–15 mole alkylene oxide adducts of said hydroxy alkylene groups, or an aliphatic unsubstituted or hydroxy substituted ether group of 2–8 carbon atoms and having at least 1 oxygen linkage therein; X being

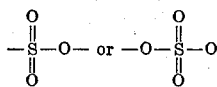

In the course of my experimentations, I have discovered that said amphoterics of Formula III could be reacted with anionic surface active agents, which are water-soluble detergent sulfonic acid salts and sulfate salts to produce water-soluble reaction products of Formula IV and having the following unexpected combination of properties: (1) they are less expensive than the compounds of Formula III employed; (2) they have wetting properties somewhat less than that of the reactants so that they have a lesser tendency to leach out natural components in hair; (3) notwithstanding the general rule that the greater the size of the molecule the less it will foam, they unexpectedly exhibit said better foaming and foam stability even at pH's in the range of 6.5 to 8; (4) they unexpectedly are of such low toxicity that no warning labels are required as determined by said "LD$_{50}$ toxicity test by ingestion of a single dose," and (5) they unexpectedly are substantially non-stinging to the eyes and non-irritating to the skin in the same concentrations as the lowest concentrations that either the compounds of Formula III or said anionic detergents of Formula V would cause stinging of the eyes and/or irritation of the skin.

According to this invention, there is first prepared an aqueous solution of (a) a compound of Formula III together with (b) one or a combination of two or more anionic compounds of Formula V, with the mole ratio being preferably 1–1, but may be in the mole ratio of 2 of (a)–1 of (b) to 2 of (b)–1 of (a). Then the aqueous solution which has a pH of 9 or more is heated to about 40°–50° C. or above and while being maintained at such elevated temperature there is slowly added thereto a weak solution of an acidic agent, such as phosphoric, citric, and preferably hydrochloric or hydroxyacetic acid under constant stirring conditions until the pH is decreased to about 8 or below to 7 for example. In this manner reaction occurs whereby the M$_1$ of G—M$_1$ is replaced by a compound of Formula III and also an addition of hydrogen thereby to provide "G" salts of compounds of Formula III, which salts are the novel compounds of this invention and are of the following formula:

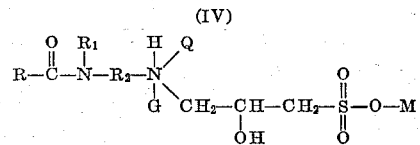

One of the specific methods which is preferably employed in carrying out an aspect of this invention is to prepare an aqueous solution containing a predetermined amount of compound of Formula III. Then a predetermined amount of compound G—M$_1$ is dissolved in water in a separate container. The solutions are combined and while being constantly stirred and heated to and maintained at about 45° C. there is slowly added thereto a weak aqueous solution of hydrochloric acid until the pH thereof is approximately 7.

The following are specific examples given merely by way of illustrating the present invention and are not to be taken by way of limitation, all parts being by weight unless otherwise specified.

*Example 1–IV*

Into a reaction vessel, there is charged an aqueous solution of 490 parts of Reactant III–1 in about 750 parts of water. While being constantly stirred there is added thereto an aqueous solution of 400 parts of sodium salt of lauroyl monoethanolamide sulfate:

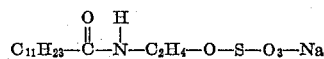

in 600 parts of water. Stirring is continued and the mass is heated to approximately 45° C. While being maintained at that temperature there is slowly added thereto weak hydrochloride acid solution until the pH thereof decreases to approximately 7. The resultant product is essentially an aqueous solution of the novel reaction product, hereinafter known as 1–IV of the following formula:

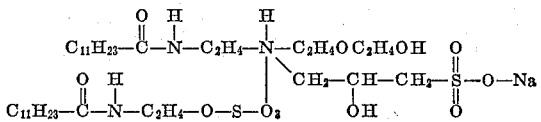

Employ the same procedure as that set forth in Example 1–IV, but employ the components set forth in the following Examples 2–IV to 14–IV—on, thereby to obtain aqueous solutions of the following novel reaction products 2–IV to 14–IV—on which are additional illustrative examples of some of the novel reaction products of this invention.

*Examples 2–IV to 5–IV*

490 parts of Reactant III–1 in 800 parts of water, and 400 parts of

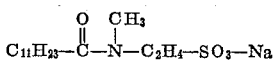

in 600 parts of water, 600 parts of

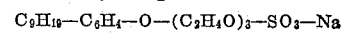

in 800 parts of water, 400 parts of

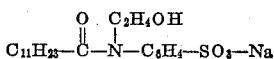

in 600 parts of water, and 450 parts of

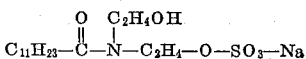

in 600 parts of water, respectively there are provided respective compounds 2–IV to 5–IV which are of the same formula as that of 1–IV except that the sulfonate or sulfate radicals of the anionic sulfonate on sulfate salts employed in these Examples 2–IV and 5–IV are respectively substituted for the sulfate radical of the formula of 1–IV.

*Examples 6–IV and 7–IV*

550 parts of Reactant III–4 in 800 parts of water and 700 parts of Reactant III–5 in 900 parts of water respectively. 400 parts of

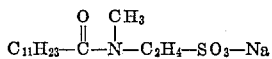

in 600 parts of water there are provided respective solutions of the following respective novel compounds 6–IV and 7–IV of the following respective formulas:

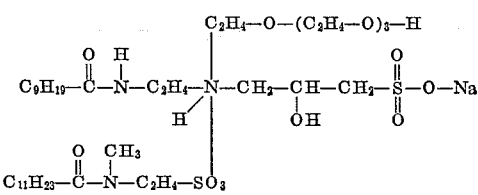

and

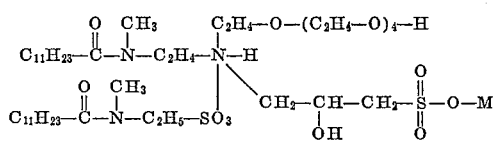

*Examples 8–IV and 9–IV*

450 parts of Reactant III–10 in 700 parts of water, 310 parts of $C_{11}H_{23}$—COO—$C_2H_4$—$SO_3$—Na in 450 parts of water and 370 parts of

in 500 parts of water respectively. The novel respective novel reaction products 14–IV and 15–IV are:

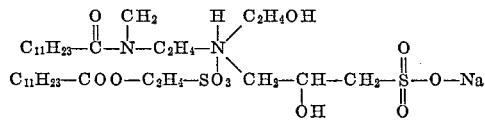

and

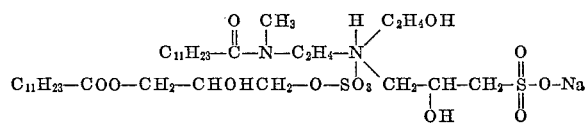

*Examples 10–IV and 11–IV*

450 parts Reactant III–7 in 750 parts water, and 400 parts sodium salt lauroyl monoethanolamide sulfate, in 600 parts water; and 490 parts of Reactant III–6 in 800 parts water and 400 parts of said sodium salt in 600 parts water; there were provided aqueous solutions of novel reaction products 10–IV and 11–IV.

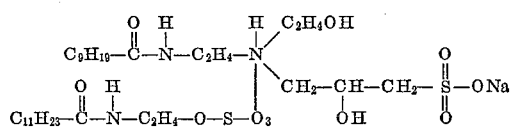

and

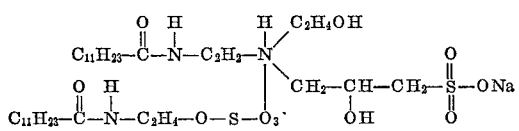

*Examples 12–IV and 13–IV*

490 parts of Reactant III–6 in 800 parts water and 450 parts Reactant III–7 in 700 parts water respectively. 400 parts sodium salt caproyl monoethanolamide sulfate in 600 parts of water there are provided solutions of the novel compounds 12–IV and 13–IV:

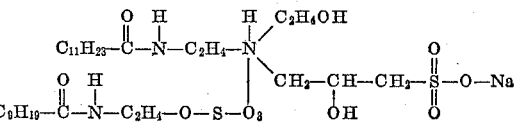

and

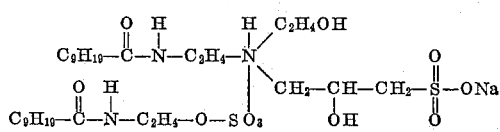

*Example 14–IV on*

Employ about 1 mole proportion of all of the other specific compounds of Formula III, some specifically described in Examples 1 to 11—on herein, respectively in about one and one-half times its weight of water and about 1 mole proportion of any of the specific anionic surface active agents (G—M$_1$) respectively in about one and one half times its weight of water there are produced literally thousands of compounds of the Formula IV herein which compounds so differ from the specific compounds of Examples 1–IV to 9–IV herein and are other specific compounds of the present invention. Specific illustrative examples of other anionic reactants are the other anionic sulfate and sulfonate salts:

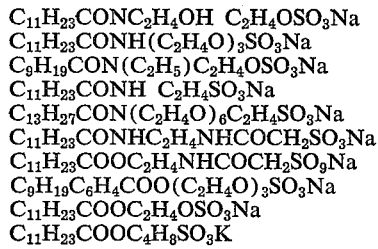

It is to be understood that as to the G radicals which terminate in X and the novel reaction products thereof when either $SO_3$ or $OSO_3$ is used in the specification or claims, it is meant to indicate either one or the other because of their equivalency and that the use of Na in compounds of this invention as set forth in the specification and claims is meant to indicate it, hydrogen any of the other alkali metals or other cation equivalents which obviously may be substituted for sodium.

I claim:
1. A salt of the formula:

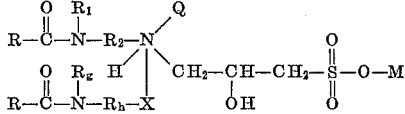

with each R being a hydrocarbon radical of 6–24 carbon atoms; $R_1$ is selected from the group consisting of (a) hydrogen, (b) alkyl radicals of 1–6 carbon atoms, (c) hydroxy alkyl radicals of 2–6 carbon atoms, and (d) 1–15 mole alkylene oxide adducts of (c); $R_2$ being selected from the group consisting of (e) alkylene groups of 2–6 carbon atoms, (f) hydroxy alkylene groups of 2–6 carbon atoms, and (g) 1–15 mole alkylene oxide adducts of (f); each mole of said alkylene oxides being of 2–4 carbon atoms; Q being selected from the group consisting of (b), (c) and (d); M is selected from the group consisting of hydrogen and alkali metals; $R_g$ is selected from the group consisting of hydrogen, an alkyl radical of 1–8 carbon atoms, an hydroxy alkyl radical of 2–8 carbon atoms and 1–15 mole alkylene oxide adducts of the available hydroxy groups in said hydroxy alkyl radical, said alkylene oxide being of 2–4 carbon atoms; $R_h$ is a group selected from the class consisting of alkylene, aromatic and aromatic-aliphatic hydrocarbon groups having a maximum of 12 carbon atoms; X is a radical selected from the group consisting of —$SO_3$ and —O—$SO_3$.

2. A salt of the formula:

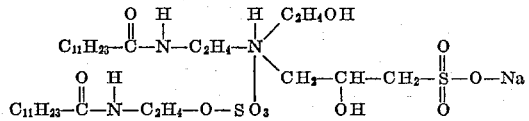

3. A salt of the formula:

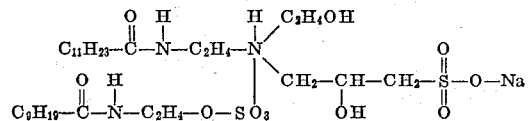

4. A salt of the formula:

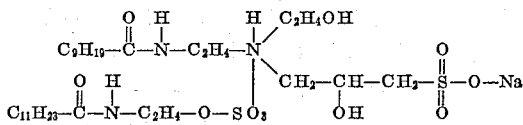

5. A salt of the formula:

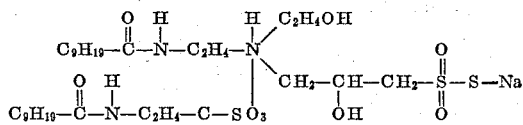

No references cited.

CHARLES B. PARKER, *Primary Examiner.*